(12) United States Patent
Hiwaki et al.

(10) Patent No.: US 9,716,417 B2
(45) Date of Patent: Jul. 25, 2017

(54) MOTOR

(75) Inventors: Hideharu Hiwaki, Osaka (JP);
Yuichiro Tashiro, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 272 days.

(21) Appl. No.: 14/406,611

(22) PCT Filed: Jun. 18, 2012

(86) PCT No.: PCT/JP2012/003951
§ 371 (c)(1),
(2), (4) Date: May 15, 2015

(87) PCT Pub. No.: WO2013/190588
PCT Pub. Date: Dec. 27, 2013

(65) Prior Publication Data
US 2015/0249376 A1    Sep. 3, 2015

(51) Int. Cl.
| H02K 5/18 | (2006.01) |
| H02K 5/04 | (2006.01) |
| H02K 5/08 | (2006.01) |
| H02K 5/20 | (2006.01) |
| H02K 5/02 | (2006.01) |

(52) U.S. Cl.
CPC ............ H02K 5/18 (2013.01); H02K 5/02 (2013.01); H02K 5/04 (2013.01); H02K 5/08 (2013.01); H02K 5/20 (2013.01)

(58) Field of Classification Search
CPC .................................. H02K 5/18; H02K 5/02
USPC ................................. 310/43, 52, 54, 58, 64
See application file for complete search history.

(56) References Cited

U.S. PATENT DOCUMENTS

| 4,818,911 A * | 4/1989 | Taguchi ................. H02K 1/148 310/194 |
| 4,823,032 A | 4/1989 | Ward et al. |
| 5,331,238 A | 7/1994 | Johnsen |
| 5,757,096 A * | 5/1998 | DuBois ................... H02K 5/18 310/64 |
| 7,009,316 B2 * | 3/2006 | Ueda ....................... H02K 3/50 310/43 |

(Continued)

FOREIGN PATENT DOCUMENTS

| JP | 07298538 | 11/1995 |
| JP | 08140300 | 5/1996 |

(Continued)

OTHER PUBLICATIONS

The Extended European Search Report dated Mar. 10, 2016 for the related European Patent Application No. 12879589.5.

(Continued)

*Primary Examiner* — Hanh Nguyen
(74) *Attorney, Agent, or Firm* — RatnerPrestia (57) ABSTRACT

Recesses and projections that extend in an axial direction are formed on an outer-circumferential surface of a molded resin body. The recesses are provided on portions where are extended outward from teeth having the winding and are on the outer circumferential surface. In addition, further recesses and projections that extend in a radial direction are formed on an axial-direction end surface of the molded resin body. The further recesses are provided on portions of the axial-direction end surface that are aligned in the axial direction with the winding.

4 Claims, 8 Drawing Sheets

(56) References Cited

U.S. PATENT DOCUMENTS

| | | | |
|---|---|---|---|
| 2006/0175917 A1 | 8/2006 | Nanbu | |
| 2007/0152523 A1* | 7/2007 | Bookout | H02K 5/00 310/87 |
| 2007/0290560 A1* | 12/2007 | Nanbu | H02K 5/15 310/90 |
| 2010/0163320 A1* | 7/2010 | Sagara | H02K 1/148 180/65.1 |
| 2010/0194214 A1* | 8/2010 | Takahashi | H02K 3/522 310/43 |

FOREIGN PATENT DOCUMENTS

| | | |
|---|---|---|
| JP | 2004320991 | 11/2004 |
| JP | 2006-043153 | 2/2006 |
| JP | 2008194264 | 8/2008 |
| JP | 2008228423 | 9/2008 |
| JP | 4339900 | 10/2009 |
| WO | 2009/041172 | 4/2009 |
| WO | 2012/017646 | 2/2012 |

OTHER PUBLICATIONS

International Search Report for International Application No. PCT/JP2012/003951 mailed Sep. 18, 2012.

\* cited by examiner

MOTOR

This application is a U.S. National Phase Application of PCT International Application PCT/JP2012/003951, filed Jun. 18, 2012.

TECHNICAL FIELD

The present invention relates to a motor for use in a washing machine and so on.

BACKGROUND ART

Conventionally, a motor including a stator formed of a molded resin body is often used in washing machines having a vertical rotation axis and in which motive power of the motor is transmitted to a washing/spin-drying tank and an agitator via belts, pulleys, and gears (See Patent Literature (PTL) 1, for example).

Figure 7:
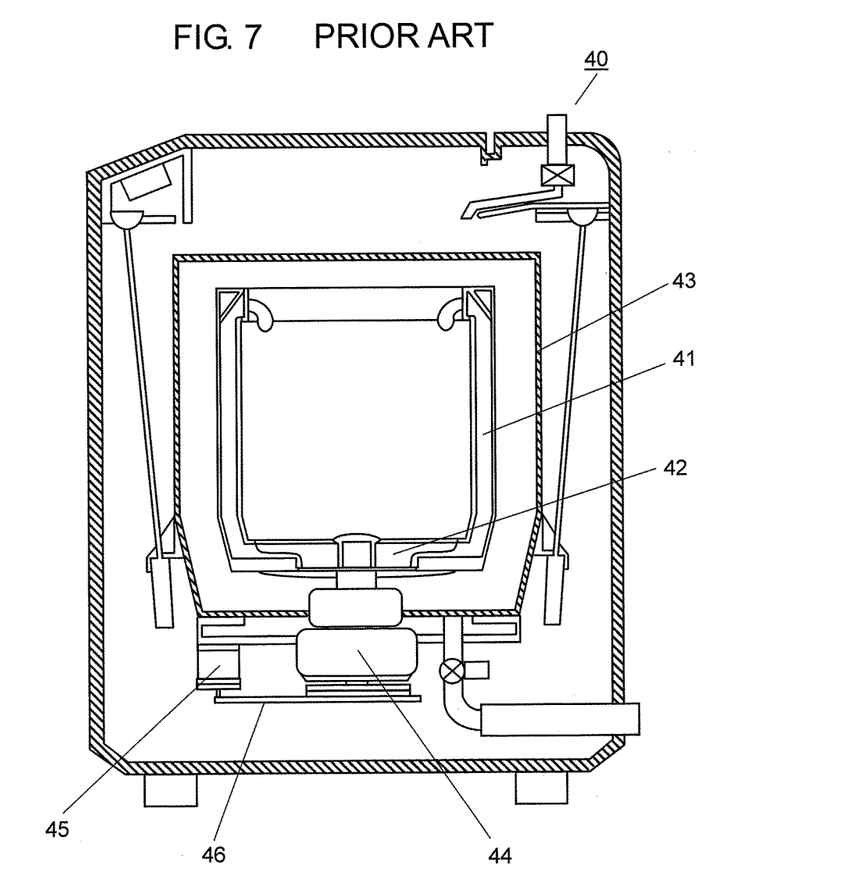
FIG. 7 is a cross-sectional view of a schematic structure of a conventional washing machine.

FIG. 7 is a cross-sectional view of a schematic structure of a conventional washing machine. As illustrated in FIG. 7, conventional washing machine 40 includes: washing/spin-drying tank 41; agitator 42 provided in a bottom surface of washing/spin-drying tank 41; and water tank 43 provided outside of washing/spin-drying tank 41 and agitator 42. Clutch device 44 is attached to a bottom surface of water tank 43. By connecting motor 45 and clutch device 44 by belt 46, a rotating force of motor 45 is transmitted to agitator 42 and washing/spin-drying tank 41 via clutch device 44. Here, clutch device 44 switches transmission of the rotating force of motor 45 to agitator 42 during washing and to washing/spin-drying tank 41 during spin-drying.

Next, a structure of motor 45 used in aforementioned conventional washing machine is described with reference to FIG. 8.

Figure 8:
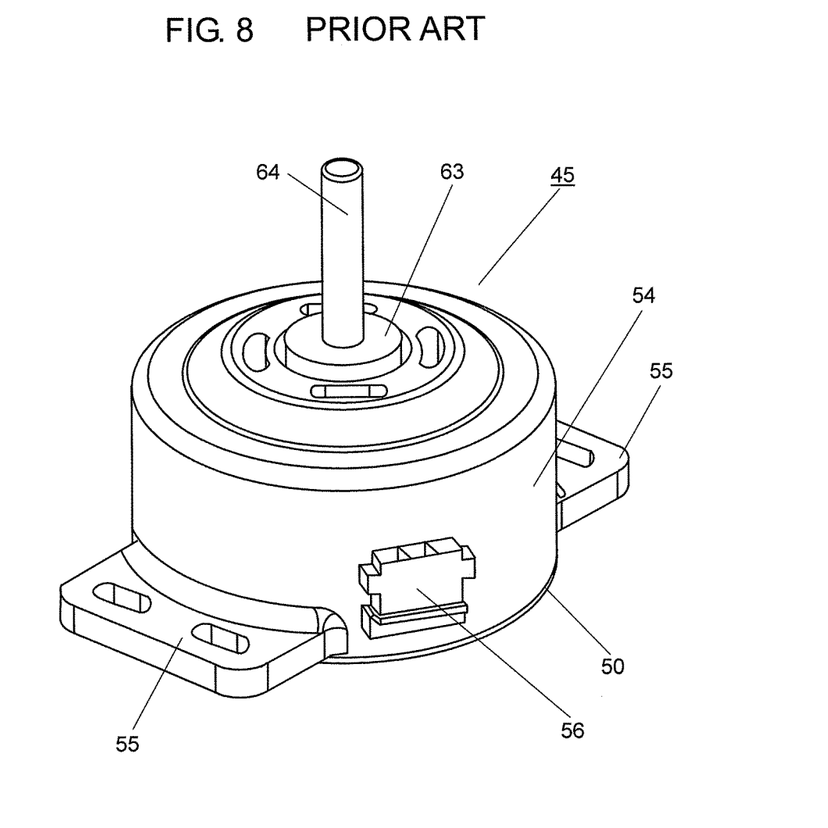
FIG. 8 is a perspective view of a schematic appearance of the conventional washing machine motor.

FIG. 8 is a perspective view of a schematic appearance of a motor used in a conventional washing machine. An outer hull of motor 45 is formed of molded resin body 54, and is fixed to the bottom surface of water tank 43 illustrated in FIG. 7 via fixing portions 55 integrally molded with molded resin body 54. Furthermore, power supply terminal 56 for supplying power to motor 45 is provided to molded resin body 54, and thus supplying power to power supply terminal 56 causes motor rotation shaft 64 to rotate. Normally, a pulley (not illustrated) is attached to motor rotation shaft 64, and the rotating force is transmitted to clutch device 44 via belt 46 illustrated in FIG. 7.

For motors of this type, there is a demand to reduce temperature rise value, improve efficiency, and reduce costs of the motor. When carrying out performance enhancement such as reducing the temperature rise value and improving efficiency in aforementioned conventional motor 45, improving heat-dissipation capability is effective. As such, together with improving motor efficiency, efforts have been made to increase heat-dissipation area by increasing axial direction length and radial direction dimension of motor 45.

Furthermore, structures have been disclosed which improve heat-dissipation capability and performance of a motor while suppressing an increase in size of the motor (see PTL 2 and PTL 3).

However, improving heat-dissipation capability by increasing the axial direction length and the radial direction dimension increases a volume of motor 45, and thus cost increases. In addition, since dimensions of motor 45 can only be changed within a range defined by dimensional restrictions of a bottom surface of washing machine 40 and dimensional restrictions of clutch device 44 and water tank 43 illustrated in FIG. 7, there is a limit to the improvement of the performance of motor 45.

On the other hand, using the structures disclosed in PTL 2 and PTL 3 entails less cost increase and dimensional restrictions compared to when only the increasing the axial direction length and radial direction dimension of the motor is carried out. However, since they are merely structures provided with a recessed and projecting shape in an axial-direction end surface of the molded resin body, it is necessary to increase a height of projections to further increase the heat-dissipation area in order to further improve performance. Therefore, within the range defined by the aforementioned dimensional restrictions, there is a limit to the improvement of heat-dissipation capability.

CITATION LIST

Patent Literature

PTL 1: Unexamined Japanese Patent Publication No. 2004-320991
PTL 2: Unexamined Japanese Patent Publication No. 2008-194264
PTL 3: Japanese Patent No. 4339900

SUMMARY OF THE INVENTION

A motor according to the present invention motor includes: a stator that includes a stator core formed of a substantially ring-like yoke and teeth extending toward an inner circumference-side of the stator in a radial direction from the yoke, and has a winding wound around the teeth via an insulator, the stator being formed of a molded resin body encapsulating the stator core, the insulator, and the winding; and a rotor including a rotor core, a motor rotating shaft inserted through a center of the rotor core and a permanent magnet inserted to the rotor core in an axial direction, the rotor core being rotatably held in the inner circumference-side of the stator via an air gap. Recesses and projections that extend in the axial direction are alternately formed on an outer-circumferential surface of the molded resin body, each of the recesses being provided on a portion that is extended outward from the teeth wound the winding and is on the outer-circumferential surface.

Accordingly, by changing only a shape of the molded resin body without increasing an axial direction dimension of the motor and without changes to the stator core, it is possible to ensure sufficient heat dissipation from a winding as a heat source toward outside of the motor via the teeth, while increasing the heat-dissipation area, and thus heat-dissipation capability can be improved.

DESCRIPTION OF EMBODIMENTS

Embodiments of a motor according to the present invention are described below with reference to the Drawings. It should be noted that the embodiments disclosed below are examples in all respects and are thus not intended to limit the scope of the present invention. The technical scope of the present invention is defined not by the content disclosed in the embodiments but by the Claims, and should be construed as including all changes within the scope of the Claims and their equivalents.

First Embodiment

Figure 1:
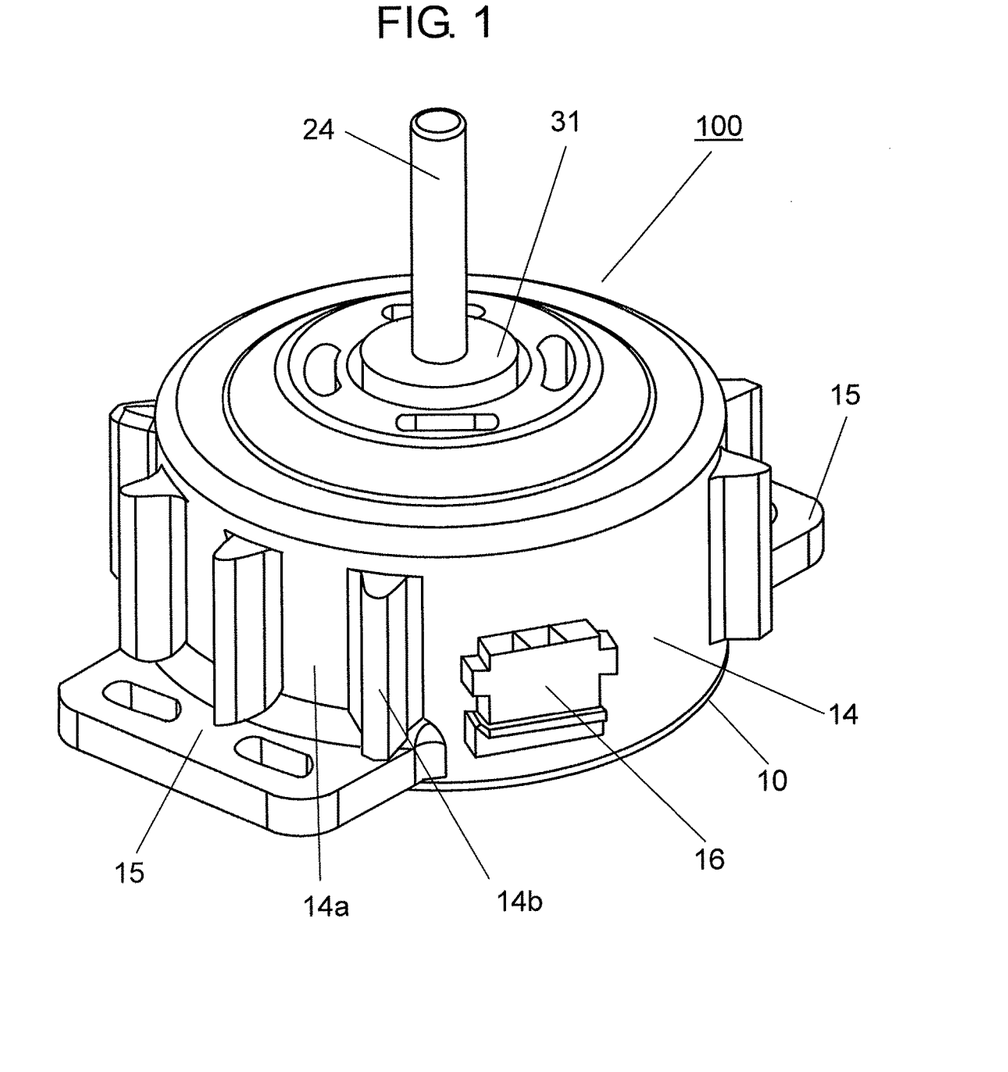
FIG. 1 is a perspective view of a schematic appearance of a washing machine motor according to a first embodiment of the present invention.

FIG. 1 is a perspective view of a schematic appearance of a washing machine motor according to the first embodiment of the present invention. It should be noted that, since a structure of a washing machine, a fixing structure of a motor to the washing machine, and a method of transmitting rotating force are the same as those in the conventional washing machine illustrated in FIG. 7, description shall be omitted here.

In FIG. 1, an outer hull of motor 100 is formed of molded resin body 14, and is integrally molded with fixing portions 15 for fixing motor 100 to the washing machine. Furthermore, power supply terminal 16 for supplying power to motor 100 is provided to molded resin body 14, and supplying power to power supply terminal 16 causes motor rotation shaft 24 to rotate. Normally, a pulley (not illustrated) is attached to motor rotation shaft 24, and the rotating force is transmitted to clutch device 44 via belt 46 illustrated in FIG. 7. Outer-circumferential-surface recesses 14a and outer-circumferential-surface projections 14b that extend in the axial direction are formed alternately on an outer-circumferential surface of molded resin body 14 in order to improve heat-dissipation capability. Although outer-circumferential-surface recesses 14a and outer-circumferential-surface projections 14b can be formed throughout a circumference of molded resin body 14, a number to be provided can be adjusted according to dimensional restrictions on motor 100 and positions and shapes of fixing portions 15 and power supply terminal 16 as illustrated in FIG. 1.

Figure 2:
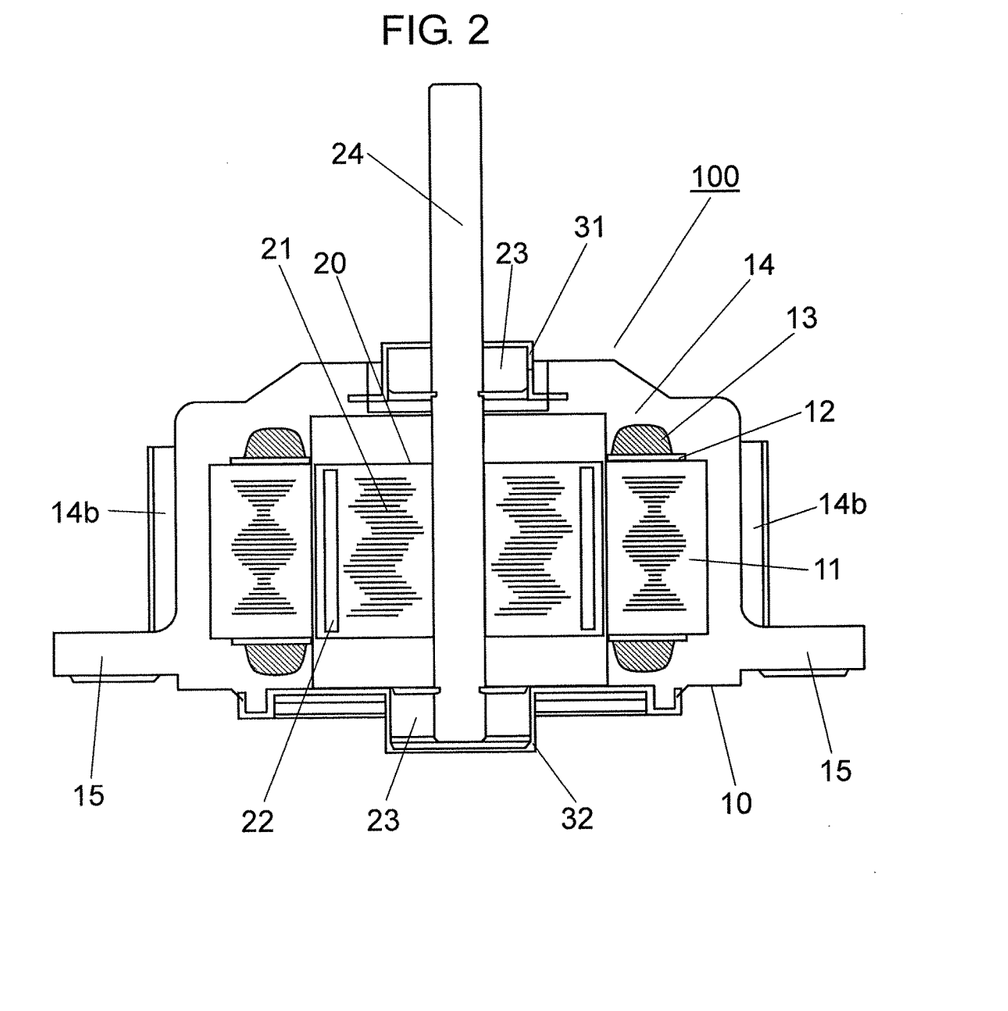
FIG. 2 is a cross-sectional view of a schematic structure of the washing machine motor according to the first embodiment of the present invention.

FIG. 2 is a cross-sectional view of a schematic structure of the washing machine motor according to the first embodiment of the present invention. In FIG. 2, motor 100 includes stator 10 and rotor 20 which is held rotatably with respect to stator 10. Stator 10 includes: stator core 11 formed by laminated thin metal plates; winding 13 wound around stator core 11 in the radial direction; insulator 12 which electrically insulates stator core 11 and winding 13; and molded resin body 14 which encapsulates, in resin, stator core 11, insulator 12, and winding 13. Furthermore, as illustrated in FIG. 1, molded resin body 14 has fixing portions 15 for fixing motor 100 to the washing machine.

Rotor 20 includes rotor core 21 and permanent magnet 22 inserted to rotor core 21. Furthermore, motor rotation shaft 24 is inserted at a center of rotor core 21, and bearings 23 are provided to motor rotation shaft 24.

Bearing housings 31 and 32 are fixed to molded resin body 14. Inserting bearings 23 into bearing housings 31 and 32 and fixing bearings 23 allows rotor 20 to be held rotatably with respect to stator 10. Then, motor rotation shaft 24 rotates caused by energizing winding 13 with the sufficient current. A driver (not shown) such as an inverter is normally used so as to energize current. Such driver can be disposed inside motor 100, but also disposed outside motor 100, and each configuration can be chose.

Next, a positional relationship between (i) winding 13 and (ii) outer-circumferential-surface recesses 14a and outer-circumferential-surface projections 14b of molded resin body 14 is described in detail with reference to FIG. 3 and FIG. 4.

Figure 3:
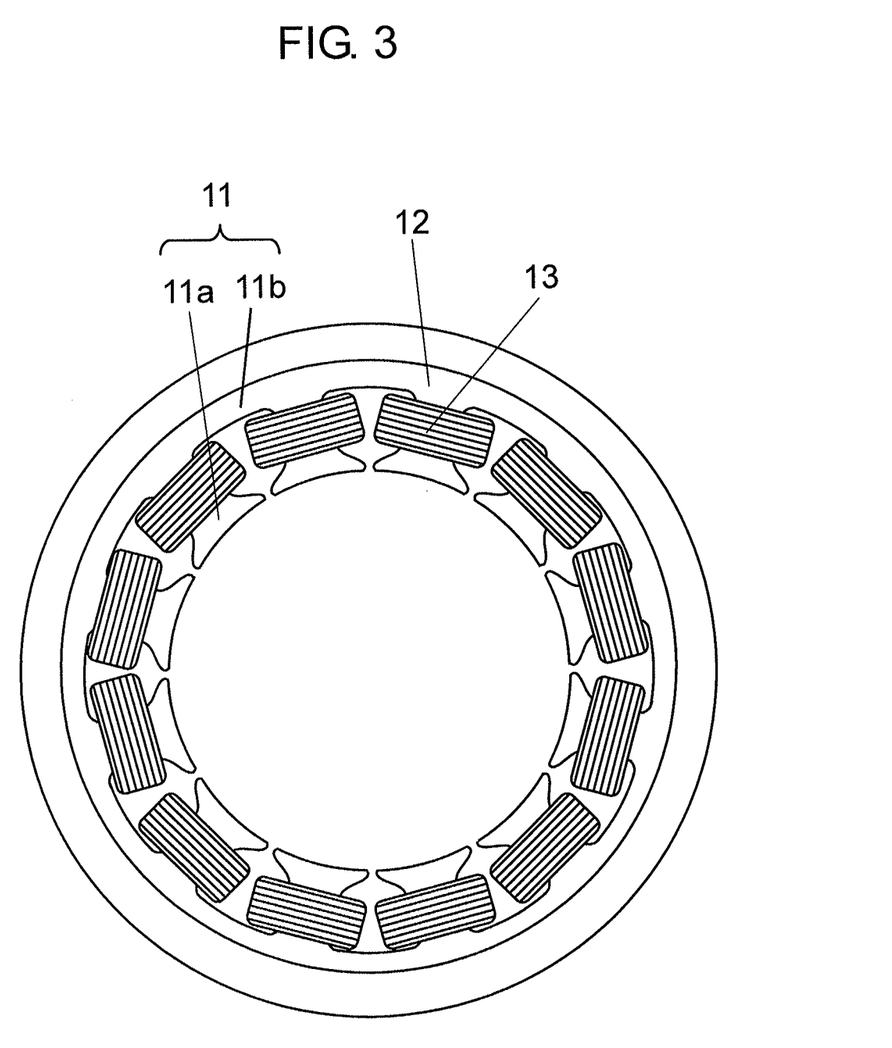
FIG. 3 is diagram illustrating a winding form of the washing machine motor according to the first embodiment of the present invention.

FIG. 3 is diagram illustrating a winding form of the washing machine motor according to the first embodiment of the present invention. FIG. 3 illustrates a state in which winding 13 is wound around stator core 11 in FIG. 2, via insulator 12. As illustrated in FIG. 3, stator core 11 includes approximately ring-like yoke 11b and teeth 11a extending in the radial direction to the inner circumference-side from yoke 11b. The winding form of motor 100 illustrated in FIG. 3 follows what is generally referred to as a concentrated winding technique. Here, winding 13 is wound around each one of teeth 11a.

Figure 4:
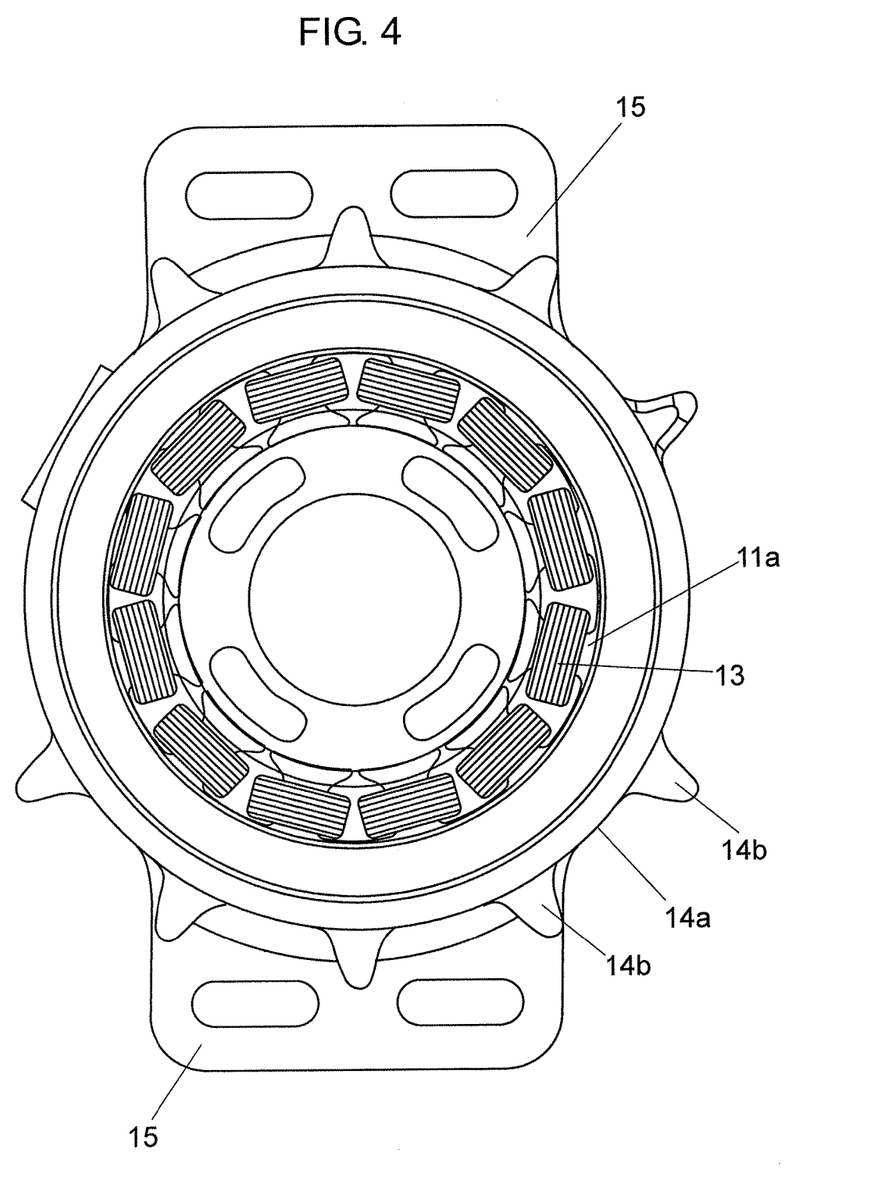
FIG. 4 is diagram illustrating a positional relationship between recesses of a molded resin body and a winding of the washing machine motor according to the first embodiment of the present invention.

FIG. 4 is diagram illustrating a positional relationship between recesses of the molded resin body and the winding of the washing machine motor according to the first embodiment of the present invention. FIG. 4 illustrates a positional relationship between (i) winding 13 illustrated in FIG. 3 and (ii) outer-circumferential-surface recesses 14a and outer-circumferential-surface projections 14b of molded resin body 14. As illustrated in FIG. 4, outer-circumferential-surface recesses 14a and outer-circumferential-surface projections 14b that extend in the axial direction are formed alternately on the outer-circumferential surface of molded resin body 14. Providing outer-circumferential-surface projections 14b allows a surface area of the outer-circumferential surface of molded resin body 14 to be easily increased. As such, heat-dissipation can be improved. In addition, heat is easily dispersed toward an air layer from winding 13 which is heat source via teeth 11a, by providing outer-circumference-surface recesses 14a on portions that are extended outward from the teeth 11a having winding 13. This prevents heat generated from winding 13 from building up inside molded resin body 14, and thus the heat dissipation from the outer-circumferential surface of molded resin body 14 can be improved.

As described above, outer-circumferential-surface recesses 14a and outer-circumferential-surface projections 14b that extend in the axial direction are formed alternately on the outer-circumferential surface of molded resin body 14. Further, outer-circumferential-surface recesses 14a are provided on portions where are extended outward from teeth 11b having winding 13 and are on the outer-circumferential surface. Such a structure allows for improvement of heat-dissipation from the outer-circumferential surface of molded resin body 14. As a result, heat-dissipation capability can be improved at low cost using a simple structure, and without entailing an excessive increase in motor size.

Second Embodiment

Figure 5:
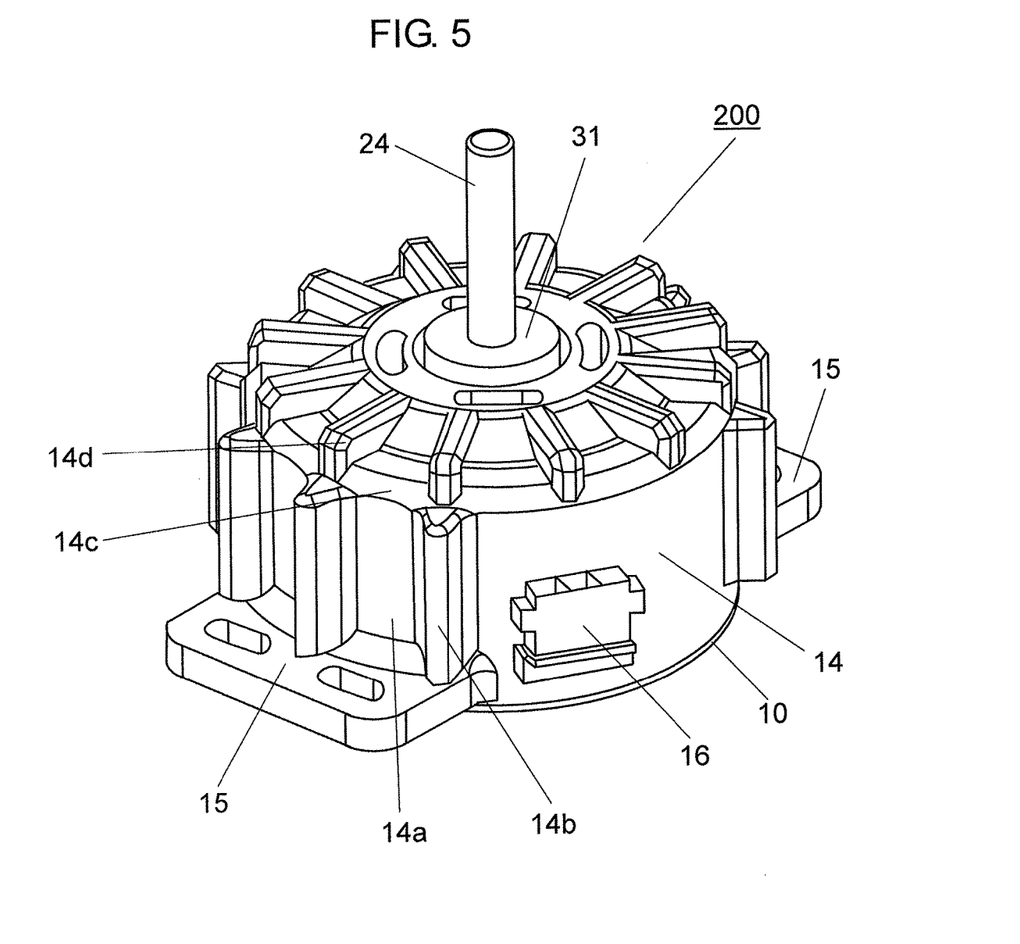
FIG. 5 is a perspective view of a schematic appearance of a washing machine motor according to a second embodiment of the present invention.

FIG. 5 is a perspective view of a schematic appearance of a washing machine motor according to a second embodiment of the present invention. It should be noted that, as in the first embodiment, since a structure of a washing machine, a fixing structure of a motor to the washing machine, and a method of transmitting rotating force are the same as those in the conventional washing machine illustrated in FIG. 7, description shall be omitted here.

In FIG. 5, an outer hull of motor 200 is formed of molded resin body 14, and is integrally molded with fixing portions 15 for fixing motor 200 to the washing machine. Furthermore, power supply terminal 16 for supplying power to motor 200 is provided to molded resin body 14, and supplying power to power supply terminal 16 causes motor rotating shaft 24 to rotate. Normally, a pulley (not illustrated) is attached to motor rotating shaft 24, and the rotating force is transmitted to clutch device 44 via belt 46 illustrated in FIG. 7. Outer-circumferential-surface recesses 14a and outer-circumferential-surface projections 14b that extend in the axial direction are formed alternately on an outer-circumferential surface of molded resin body 14 in order to improve heat dissipation capability. In addition, end-surface recesses 14c and end-surface projections 14d that extend in the radial direction are formed alternately on an axial-direction end surface of molded resin body 14 in order to improve heat-dissipation capability. Although it is preferable that end-surface recesses 14c and end-surface projections 14d be formed throughout a circumference of the axial-direction end surface of molded resin body 14, a number to be provided may be reduced. A structure and winding form of motor 200 according to the second embodiment illustrated in FIG. 5 are same as those in motor 100 according to the first embodiment illustrated in FIG. 2 and FIG. 3.

Figure 6:
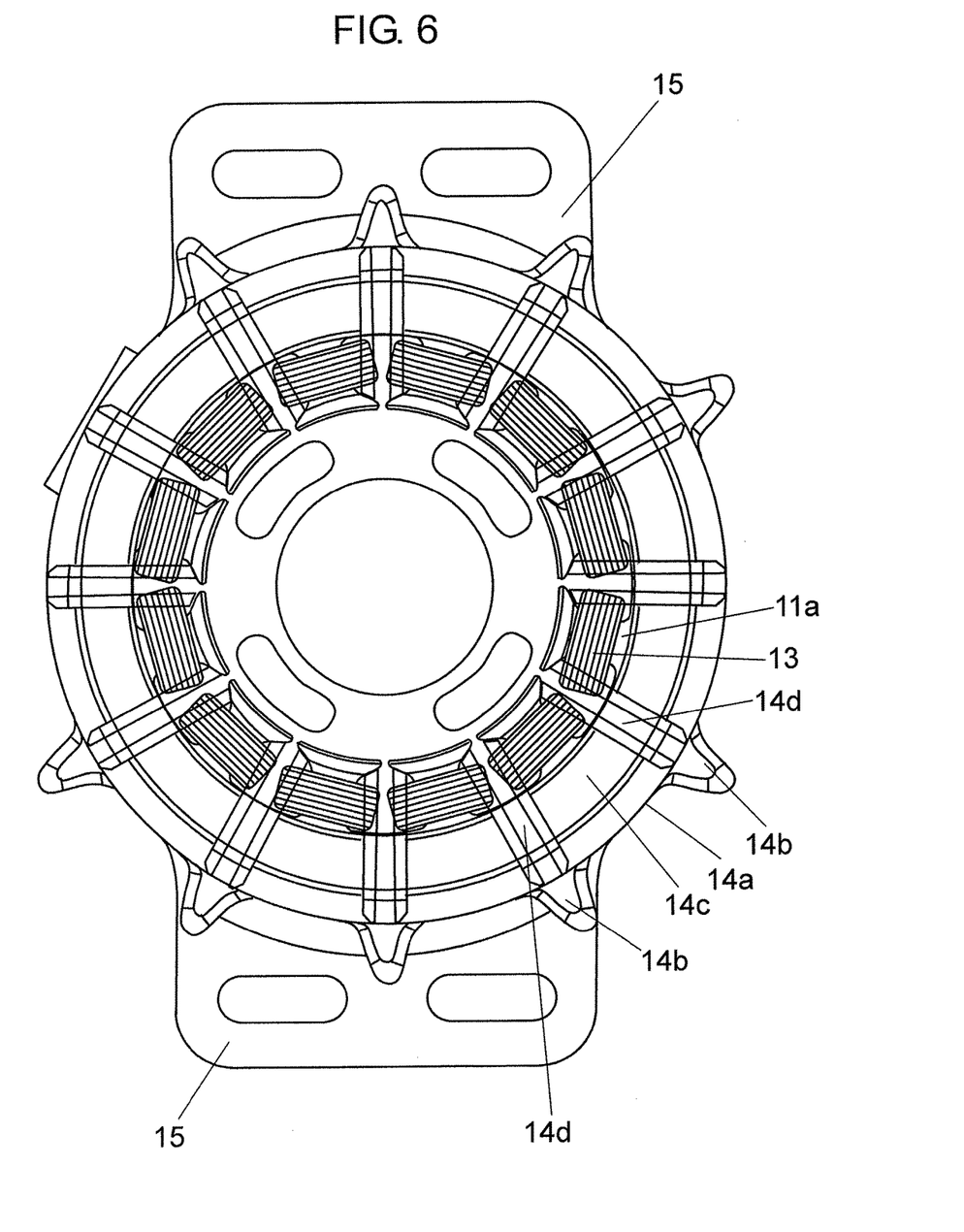
FIG. 6 is diagram illustrating a positional relationship between recesses of the molded resin body and the winding of the washing machine motor according to the second embodiment of the present invention.

FIG. 6 is diagram illustrating a positional relationship between recesses of the molded resin body and the winding of the washing machine motor according to the second embodiment of the present invention. FIG. 6 illustrates a positional relationship between (i) outer-circumferential-surface recesses 14a, outer-circumferential-surface projections 14b, end-surface recesses 14c, and end-surface projections 14d of molded resin body 14 and (ii) winding 13. As illustrated in FIG. 6, outer-circumferential-surface recesses 14a and outer-circumferential-surface projections 14b that extend in the axial direction are formed alternately on the outer-circumferential surface of molded resin body 14, and end-surface recesses 14c and end-surface projections 14d that extend in the radial direction are formed alternately on an axial-direction end surface of molded resin body 14. Positions and effects of outer-circumferential-surface recesses 14a and outer-circumferential-surface projections 14b are same as those described in the first embodiment. In the second embodiment, providing end-surface projections 14d in addition to outer-circumferential-surface projections 14b allows a surface area of the end surface of molded resin body 14 to be easily increased. In addition, providing end-surface recesses 14c on portions of the axial-direction end surface that are aligned in the axial direction from winding 13 allows a reduction of a distance between winding 13, which are heat sources, and the air layer to which heat is to be dispersed. With this, it becomes possible to prevent heat generated from winding 13 from building up inside molded resin body 14, and thus improve the heat dissipation from both the outer-circumferential surface and the axial-direction end surface of molded resin body 14.

Furthermore, although heat conductivity of a normally used resin material is approximately 1.1 W/m·K, having a heat conductivity of at least 1.4 W/m·K for a resin material included in molded resin body 14 improves heat conductivity between winding 13 and outer-circumferential-surface recesses 14a and end-surface recesses 14c. This further prevents heat from building up inside molded resin body 14 and thus improves heat-dissipation capability.

As described above, outer-circumferential-surface recesses 14a and outer-circumferential-surface projections 14b that extend in the axial direction are formed alternately on the outer-circumferential surface of molded resin body 14, with outer-circumferential-surface recesses 14a being provided in portions of the outer-circumferential surface that are aligned in the outer circumference direction from teeth 11a having winding 13. In addition, end-surface recesses 14c and end-surface projections 14d that extend in the radial direction are formed alternately on an axial-direction end surface of molded resin body 14, with end-surface recesses 14c being provided in portions of the axial-direction end surface that are aligned in the axial direction from winding 13. Such a structure allows for improvement of heat-dissipation from the outer-circumferential surface and the axial-direction end surface of molded resin body 14. As a result, heat-dissipation capability can be further improved at low cost using a simple structure, and without entailing an excessive increase in motor size. Furthermore, having a heat conductivity of at least 1.4 W/m·K for the resin material included in molded resin body 14 improves heat conductivity between winding 13 and outer-circumferential-surface recesses 14a and end-surface recesses 14c. This further prevents heat from building up inside molded resin body 14 and thus improves heat-dissipation capability.

It should be noted that although the forgoing embodiments illustrate an inner-rotor motor structure in which the rotor is provided in an inner circumference of the stator, as long as the recesses are provided in portions that do not interfere with the rotor, the same effect can be obtained even with other forms of motors such as an outer-rotor motor in which the rotor is provided in an outer circumference of the stator and an axial gap motor in which a stator and a rotor are provided in the axial direction via an air gap.

As described above, a motor according to the present invention motor includes: a stator that includes a stator core formed of a substantially ring-like yoke and teeth extending toward an inner circumference-side of the stator in a radial direction from the yoke, and has a winding wound around the teeth via an insulator, the stator being formed of a molded resin body encapsulating the stator core, the insulator, and the winding; and a rotor including a rotor core, a motor rotating shaft inserted through a center of the rotor core and a permanent magnet inserted to the rotor in an axial direction, the rotor core being rotatably held in the inner circumference-side of the stator via an air gap. Recesses and projections that extend in the axial direction are alternately formed on an outer-circumferential surface of the molded resin body, each of the recesses being provided in a portion of the outer-circumferential surface that is aligned in an outer circumference direction from the teeth having the winding.

Accordingly, by changing only the shape of the molded resin body without increasing the axial direction dimension of the motor and without changes to the stator core, it is possible to ensure sufficient heat dissipation from the winding which is a heat source while increasing the heat-dissipation area, and thus heat-dissipation capability can be improved.

Furthermore, in the motor according to the present invention, recesses and projections that extend in the radial direction are alternately formed on an axial-direction end surface of the molded resin body, each of the recesses being provided in a portion of the axial-direction end surface that is aligned in the axial direction with the winding.

Accordingly, since the heat-dissipation area can be further increased in the state where heat-dissipation from the winding is sufficiently ensured and without excessively increasing the dimensions of the motor, a motor having more superior heat-dissipation capability can be realized.

Furthermore, in the motor according to the present invention, the molded resin body includes a resin material having a heat conductivity of at least 1.4 W/m·K. Accordingly, since the heat conductivity between the winding and the recesses of the molded resin body is improved compared to the heat conductivity of a resin material that is normally used, and heat does not easily build up inside the molded resin body, a rise in the temperature of the winding can be suppressed, and thus the performance of the motor can be improved.

INDUSTRIAL APPLICABILITY

A motor according to the present invention allows heat-dissipation capability to be improved without entailing excessive increases in motor dimensions and cost, thus allowing a small and high-performance motor to be provided, and is thus suitable for use in home appliances represented by a washing machine, and so on, that require small size and high performance.

The invention claimed is:
1. A motor comprising:
  a stator that includes a stator core formed of a substantially ring-like yoke and teeth extending in a radial direction from an inner circumference-side of the yoke, and a winding wound around the teeth via an insulator, the stator being formed of a molded resin body encapsulating the stator core, the insulator, and the winding; and
  a rotor including a rotor core, a motor rotating shaft inserted through a center of the rotor core and a permanent magnet inserted to the rotor core in an axial direction, the rotor core being rotatably held in the inner circumference-side of the stator via an air gap,
  wherein recesses and projections that extend in the axial direction are alternately formed on an outer-circumferential surface of the molded resin body, each of the recesses being provided on a portion that is extended outward from the teeth wound with the winding and is on the outer-circumferential surface.
2. The motor according to claim 1,
  wherein recesses and projections that extend in the radial direction are alternately formed on an axial-direction end surface of the molded resin body, each of the recesses being provided in a portion of the axial-direction end surface that is aligned in the axial direction with the winding.
3. The motor according to claim 2,
  wherein the molded resin body includes a resin material having a heat conductivity of at least 1.4 W/m·K.
4. The motor according to claim 1,
  wherein the molded resin body includes a resin material having a heat conductivity of at least 1.4 W/m·K.

* * * * *